US006841143B2

(12) United States Patent
Inagaki et al.

(10) Patent No.: US 6,841,143 B2
(45) Date of Patent: Jan. 11, 2005

(54) MESOSTRUCTURED OXIDE CERAMICS AND THEIR SYNTHESIS METHOD

(75) Inventors: Masahiko Inagaki, Aichi (JP); Atsushi Hozumi, Aichi (JP); Kei Teraoka, Aichi (JP); Kaori Nishizawa, Aichi (JP); Fukue Nagata, Aichi (JP); Yoshiyuki Yokogawa, Aichi (JP); Tetsuya Kameyama, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 179 days.

(21) Appl. No.: 09/946,327

(22) Filed: Sep. 6, 2001

(65) Prior Publication Data

US 2002/0031470 A1 Mar. 14, 2002

(30) Foreign Application Priority Data

Sep. 7, 2000 (JP) .................................. 2000-272333

(51) Int. Cl.[7] ............................................. C01G 25/02
(52) U.S. Cl. ...................... 423/608; 423/618; 423/622
(58) Field of Search ................................ 423/608, 618, 423/622, 339

(56) References Cited

U.S. PATENT DOCUMENTS

| 5,507,296 | A | | 4/1996 | Bales et al. | |
|---|---|---|---|---|---|
| 5,786,294 | A | * | 7/1998 | Sachtler et al. | 502/349 |
| 6,120,891 | A | * | 9/2000 | Balkus, Jr. et al. | 428/336 |
| 6,139,814 | A | * | 10/2000 | Shigapov et al. | 423/592 |
| 6,162,414 | A | * | 12/2000 | Pinnavaia et al. | |
| 6,228,340 | B1 | * | 5/2001 | Imhof et al. | 423/338 |
| 6,334,988 | B1 | * | 1/2002 | Gallis et al. | 423/326 |
| 6,395,350 | B1 | * | 5/2002 | Balkus, Jr. et al. | 427/556 |
| 6,465,387 | B1 | * | 10/2002 | Pinnavaia et al. | 502/158 |
| 6,562,310 | B2 | * | 5/2003 | Schwarz | 423/338 |
| 6,592,842 | B2 | * | 7/2003 | Elder et al. | 423/610 |

FOREIGN PATENT DOCUMENTS

| WO | WO 9937705 | * | 7/1999 |
|---|---|---|---|
| WO | WO 2001032558 | * | 5/2001 |
| WO | WO 2001055031 | * | 8/2001 |

OTHER PUBLICATIONS

Liu et al. "Mesostructured Zironium Oxide" Mat'ls Research Society Symposium Proceedings, 431 (Microporous & Macroporous Nat'ls) 101–110, 1996.*
"Synthesis & Characterzation of Mesostructured Tin Oxide with Crystalline Walls" Qi et al. Langmeir (1998), 14(9), 2579–2581.*
"Synthesis & Characterization of Mesastructural Mathes" Biz et al. Catalysis Reviews—Science & Engineering (1998), 40(3), 329–407.*

(List continued on next page.)

Primary Examiner—Paul Marcantoni
(74) Attorney, Agent, or Firm—Oblon, Spivak, McClelland, Maier & Neustadt, P.C.

(57) ABSTRACT

This invention provides mesostructured oxide ceramics and a synthesizing method thereof, the synthesizing method employs a water-based solvent containing a metallic salt or metal complex as the ceramics precursor, template formed from an organic compound or the association thereof, and a precipitant, wherein mesostructured oxide ceramics are obtained from self-assembled oxide ceramics and organic substance by directly extracting oxide ceramics at a low temperature of 200° C. or less by utilizing a homogenous precipitation reaction from said ceramics precursor under the coexistence of a nanometer-sized template in the solvent, and separating and collecting the obtained precipitation, and mesostructured oxide ceramics is prepared by employing the synthesizing method described above.

15 Claims, 1 Drawing Sheet

OTHER PUBLICATIONS

"Supramolecular Assembly of Mesistructal tin oxide" Sevesin et al. Chemical Commts (Cambridge), 14, 1471–1472, 1998.*

"On the way to new nanoporus transition metal oxides" Murth et al. Studies in Surface Science & Catalysis (2000), 129 Nanoporous Nat'ls II, Proceedings of Conference on Access in Nanoporous Mat'ls 2000) 357–366.*

"Preparation of mesoporous tin oxide via supramelinedlr templating" Nishida et al. Chemical Sensors (2000), 16 (Suppl. A), 19–21.*

M. Yada, et al., Angew, Chem. Int. Ed., vol. 38, No. 23, pp. 3506–3510, "Mesoporous Magnetic Materials Based on Rare Earth Oxides", 1999.

E. Matijevic, et al., Journal of Colloid and Interface Science, vol. 118, No. 2, pp. 506–523, "Preparation and Properties of Monodispersed Colloidal Particles of Lanthanide Compounds", Aug. 1987.

P. Yang, et al., Nature, vol. 396, pp. 152–155, "Generalized Syntheses of Large–Pore Mesoporous Metal Oxide with Semicrystalline Frameworks", Nov. 12, 1998.

P–L. Chen, et al., Journal of the American Ceramic Society, vol. 76, No. 6, pp. 1577–1583, "Reactive Cerium(IV) Oxide Powers by the Homogeneous Precipitation Method", 1993.

* cited by examiner

MESOSTRUCTURED OXIDE CERAMICS AND THEIR SYNTHESIS METHOD

BACKGROUND OF THE INVENTION

1. Field of the Invention

The present invention generally relates to mesostructured oxide ceramics and the synthesizing method thereof, and particularly to a novel synthesizing method of materials having a mesostructure (mesostructured materials) wherein the wide application in sensors, absorbing agents, catalytic carriers and the like is anticipated, as well as to mesostructured oxide ceramics synthesized with the aforementioned method.

The present invention provides direct synthesizing technology of mesostructured materials at low temperature enabling the formation of a mesostructure of various compound oxides that was difficult with conventional methods.

2. Description of the Related Art

As a conventional synthesizing method of mesostructured materials, reported is a method of employing metal alkoxide (J. S. Beck, Specification of U.S. Pat. No. 5,507,296 (1991)). The mesostructured material directly obtained with this method is the amorphous material of ceramics, and a non-reacting organic silanol group remains. Moreover, the mesostructured material directly obtained with this method is thermally unstable. Thus, as it is difficult to form a desired structure due to its thermal and chemical unstableness, it is not able to yield sufficient functions as a sensor or catalytic carrier. As another synthesizing method of mesostructured materials, reported is a method of employing hydrolysis of metal chloride (P. Yang et al., Nature, 396, 152–155 (1998)). As this method does not utilize a water-based solvent, organic substance capable of becoming the template and the association thereof is limited. Further, as metal alkoxides and metal chlorides are used, atmospheric control during the synthesis is indispensable.

Meanwhile, although a synthesizing method of mesostructured materials by a homogenous precipitation method employing urea as the precipitant has also been reported (M. Yada et al., Angew. Chem. Int. Ed., 38, 3506–3509 (1999)), the ceramics directly obtained with this method are carbonate. In each of the synthesizing methods described above, as it is necessary to conduct thermal processing at 600° C. or higher in order to obtain chemically stable and highly functional oxides [E. Matijevic and W. P. Hsu, J. Colloid Interface Sci., 118, 506–23 (1987)], there is a problem in that the mesostructure will be destroyed as a result thereof. In addition, it is not possible to incorporate a functional organic compound or a functional group having the functions of absorbing specific wavelengths of light or fluorescence in the organic substance capable of becoming the template or the association thereof. Although considered may be a method of incorporating functional organic substance in the mesostructure after removing the organic substance to become the template, the manufacture process becomes complex, and it cannot be denied that this will be inferior in terms of manufacturing costs.

In light of the aforementioned situation and in consideration of the related art described above, the present inventors have conducted intense study aiming to develop a new synthesizing method of mesostructured materials capable of definitely resolving the problems encountered in the aforementioned conventional synthesizing methods and, as a result, have discovered that their desired goal can be reached by directly extracting oxide ceramics at a low temperature of 200° C. or less by utilizing homogenous precipitation reaction from a ceramics precursor under the coexistence of a nanometer-sized template formed of an organic compound or the association thereof, and arrived at the completion of the present invention based on such discovery.

SUMMARY OF THE INVENTION

Provided is mesostructured oxide ceramics and a synthesizing method thereof. A synthesizing method employs a water-based solvent containing a metallic salt or metal complex as the ceramics precursor, template formed from an organic compound or the association thereof, and a precipitant, wherein mesostructured oxide ceramics are obtained from self-assembled oxide ceramics and organic substance by directly extracting oxide ceramics at a low temperature of 200° C. or less by utilizing a homogenous precipitation reaction from said ceramics precursor under the coexistence of a nanometer-sized template in the solvent, and separating and collecting the obtained precipitation, and mesostructured oxide ceramics is prepared by employing the synthesizing method described above.

Unlike conventional synthesizing methods, an object of the present invention is to provide mesostructured oxide ceramics via direct synthesis under a low temperature of 200° C. or less where the mesostructure and organic compound will not be destroyed, and the manufacturing method thereof.

Another object of the present invention is to provide mesostructured oxide ceramics having further functions added by incorporating a functional group or a functional organic compound having specific functions of absorbing specific wavelengths of light or fluorescence in a nanometer-sized template formed from the aforementioned organic compound or the association thereof, and the manufacturing method thereof.

In order to resolve the aforementioned problems, the present invention is structured from the following technical means.

(1) A synthesizing method of mesostructured oxide ceramics employing a water-based solvent containing a metallic salt or metal complex as the ceramics precursor, template formed from an organic compound or the association thereof, and a precipitant, wherein mesostructured oxide ceramics are obtained from self-assembled oxide ceramics and organic substance by directly extracting oxide ceramics at a low temperature of 200° C. or less by utilizing a homogenous precipitation reaction from the ceramics precursor under the coexistence of a nanometer-sized template in the solvent, and separating and collecting the obtained precipitation.

(2) The synthesizing method of mesostructured oxide ceramics according to paragraph (1) above, wherein the nanometer-sized template is formed from one type or a plurality of types of organic compounds or the associations thereof.

(3) The synthesizing method of mesostructured oxide ceramics according to paragraph (1) above, wherein one type or a plurality of types of organic compounds or the associations thereof are used as the nanometer-sized template, and a functional group or a functional organic compound having specific functions of absorbing specific wavelengths of light or fluorescence is incorporated thereto, so that the above-mentioned one type or plurality of types of organic compounds or the associations thereof exhibit those functions.

(4) A synthesizing method of mesostructured oxide ceramics of obtaining mesostructured oxide ceramics by removing organic substances from the mesostructured oxide ceramics prepared according to the method according to paragraph (1) above.

(5) The synthesizing method of mesostructured oxide ceramics according to paragraph (4) above, wherein a non-organic compound is formed in the mesostructure by employing one type or a plurality of types of organic compounds or the associations thereof as the nanometer-sized template, incorporating an organic metallic compound thereto, and making the organic metallic compound inorganic during the process of removing the organic compound.

(6) Mesostructured oxide ceramics prepared by employing the synthesizing method according to any one of paragraphs (1) to (5) above.

DESCRIPTION OF THE PREFERRED EMBODIMENTS

Figure 1:
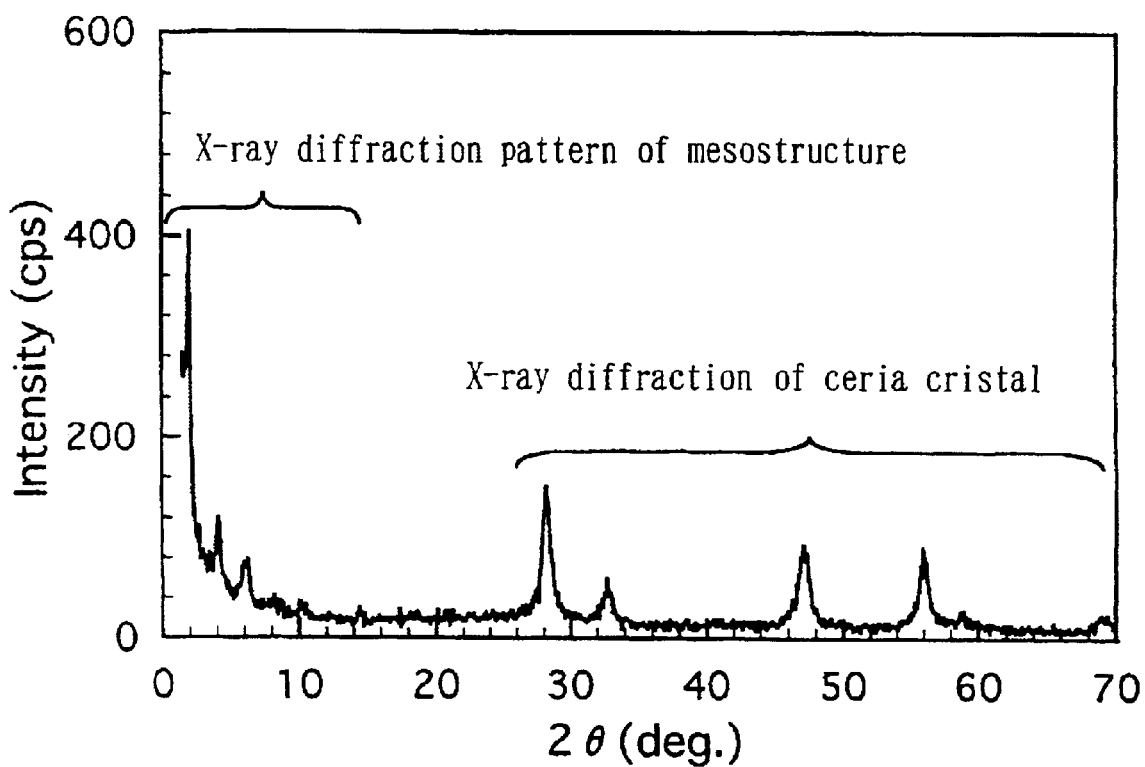
FIG. 1 illustrates an X-ray diffraction pattern of mesostructured ceria ceramics according to Example 1.

The present invention is now described in further detail.

The present invention pertains to a method of synthesizing mesostructured oxide ceramics, using a water-based solvent containing metallic salt or metal complex as the ceramics precursor, template formed from an organic compound or the association thereof, and a water-based solvent containing a precipitant, and the uttermost characterisctics of this method resides in the fact that mesostructured oxide ceramics are directly synthesized at a low temperature of 200° C. or less by directly extracting oxide ceramics, utilizing a homogenous precipitation reaction from the aforementioned ceramics precursor.

Mesostructured oxide ceramics as described in the present invention shall mean crystalline oxide ceramics or the aggregate of the particulates thereof possessing a mesostructure alone or in combination with an organic substance.

Exemplified in the present invention as preferable choices are nitrates, sulfates and the like as the metallic salt or metal complex as the ceramics precursor; block copolymers, surface active agents and the like as the template formed from organic substance or the association thereof; and hexamethylenetetramine as the precipitant, respectively.

Any homogenous precipitation reaction utilized in the present invention may be arbitrarily used so as long as the oxide ceramics can be subject to direct precipitation. For example, exemplified is a method of directly extracting oxide ceramics such as tin oxide, zinc oxide, ceria (cerium oxides) and the like by employing homogenous precipitation reaction. Moreover, as the organic compound or the association thereof to be used as the template, arbitrarily used may be the extracted metallic salt or metal complex to be the ceramics precursor, or a material having a surface potential or a functional group capable of generating interaction with the extracted ceramics.

As a method of the present invention, exemplified as a preferable example is a method of dissolving an organic compound having a hydrophilic group and hydrophobic group such as an appropriate surface active agent and the like in a solvent, generating an aggregate of micelle and the like via association by making them more than a specific concentration, and further directly extracting the metal ion coexisting in such solvent as an oxide by a suitable homogenous precipitation reaction, and, thereupon, obtaining a mesostructure by making the extracted oxide self-assemble pursuant to the interaction with the coexisting micelle. The homogenous precipitation reaction, precipitant, and the organic compound or the association thereof to become the template are not limited to the above, and the type of homogenous precipitation reaction, precipitant, and the organic compound or the association thereof may be suitably changed in accordance with the objective of the products, and they may be suitably combined and respectively conducted with a similar method.

Mesostructured oxide ceramics may be synthesized pursuant to the aforementioned methods. As a specific example, 1-hexadecane sodium sulfide is used, for instance, as the organic compound or the association thereof to be the aforementioned template; hexamethylenetetramine is used as the precipitant, for instance, in the aforementioned homogenous precipitation reaction; and the reaction extracted by ceria (cerium oxide) from the cerium nitrate solution is used to synthesize oxide ceramics at 95° C. The synthesized ceria ceramics exhibited a periodic structure characteristic to a mesostructure of 4 nm, 2 nm and 1.5 nm, and a diffraction pattern pursuant to ceria crystals.

In the aforementioned synthesizing method, the reason why mesostructured oxide ceramics are generated is presumed to be pursuant to the appearance of the self-assembly of oxide ceramics and the organic substance due to the interaction of the metallic salt or metal complex to become the ceramics precursor, or the extracted oxide ceramics, and the surface of the organic compound or the association thereof to become the template.

In the oxide ceramics, wherein the oxide ceramics and the organic substance have a mesostructure, obtained from the aforementioned synthesizing method, it is possible to incorporate a specific functional group or a functional organic compound having the functions of absorbing specific wavelengths of light, fluorescence and the like to the organic compound or the association thereof used as the template. A specific functional group or a functional organic compound having the functions of absorbing specific wavelengths of light, fluorescence and the like as used in the present invention shall be defined to mean a specific functional group or a functional organic compound showing photochemical effects such as absorption of specific wavelengths of light, fluorescence, luminescence, color development and the like. Specifically, for example, exemplified may be the color development pursuant to the incorporation of organic pigments, and ultraviolet radiation screening pursuant to the incorporation of ultraviolet radiation absorbents.

Moreover, as a method of removing organic substance from the aforementioned mesostructured oxide ceramics, specifically, for example, exemplified may be the method of conducting decantation, thermal processing or photooxidation processing independently, or in combination.

Further, as a method of incorporating an organic metallic compound in the organic compound or the association thereof used as the template and making the organic metallic compound inorganic during the process of removing the organic compound, specifically, for example, exemplified may be the method of conducting decantation, thermal processing or photooxidation processing independently, or in combination.

In addition, by controlling the structure and size of the organic compound or the association thereof used as the template, the structure and size of the pores may be controlled.

The method of the present invention exhibits the following advantages.

(1) The mesostructured oxide ceramics are directly synthesized from a ceramics precursor without requiring thermal processing at high temperatures;
(2) The organic compound or the association thereof to be used for the template is not limited because a water-based solvent is used;
(3) The product is directly synthesized at a low temperature of 200° C. or less;
(4) The thermally and chemically stable, and highly functional oxide ceramics are obtained;
(5) There is no problem of the mesostructure being destroyed;
(6) A specific functional group or a functional organic compound having functions of absorbing specific wavelengths of light, fluorescence and the like is incorporated in the organic compound or the association thereof to be used as the template;
(7) The manufacturing process is simplified;
(8) The product having the controlled structure and size of the pores is obtained; and
(9) The product having a mesostructure in which an inorganic compound is formed.

Further, the mesostructured oxide ceramics synthesized with the method of the present invention comprise the following characteristics.

(1) The ceramics portion of the product is crystal;
(2) It is thermally and chemically stable, and has a desired structure to be formed;
(3) The product having higher functions is obtained by incorporating a specific functional group or a functional organic compound in the template;
(4) The product having selectivity against the absorption of molecules and the like is provided by controlling the structure and size of the pores;
(5) The product having catalytic activity and the like is provided by forming an inorganic compound in the mesostructure; and
(6) The catalysts with selectivity against molecules and the like are synthesized by controlling the structure and size of the pores and forming an inorganic compound in the mesostructure.

As the mesostructured oxide ceramics of the present invention, listed may be those wherein the oxide ceramics and the organic substance have a mesostructure; those wherein the oxide ceramics have a mesostructure by removing the organic substance; those wherein an inorganic compound is formed in the mesostructure by incorporating an organic metallic compound in the template and making such organic metallic compound inorganic during the process of removing the organic compound; those provided with sophisticated functions by incorporating a specific functional group or a functional organic compound in the template; and so on. These may be respectively used in sensors, adsorbents, catalytic carriers, absorbents of light of a specific wavelength, screening agents of harmful ultraviolet radiation, pigments, and the like.

EXAMPLES

Although the present invention is now explained in detail based on the following examples, the present invention shall in no way be limited to the examples described below.

Example 1

Cerium nitrate, 1-hexadecane sodium sulfide, hexamethylenetetramine and water were mixed in a molar ratio of 1:0.2:4:1000 to prepare a solution, and such solution was kept at 95° C. for 20 hours, and the obtained precipitates were filtered, washed with water and then lyophilized.

The obtained ceramics exhibited a periodic structure characteristic to a mesostructure of 4.2 nm, 2.1 nm and 1.4 nm in an X-ray diffractometry, and a diffraction pattern pursuant to ceria crystals.

Example 2

The ceramics obtained by removing the organic substance as a result of performing photooxidation with a $\lambda$=172 nm UV light against the ceramics obtained in Example 1 above exhibited a periodic structure characteristic to a mesostructure of 4 nm in an X-ray diffractometry, and a diffraction pattern pursuant to ceria crystals. Moreover, the absorption band by the organic substance disappeared in the infrared absorption measurement.

Example 3

Cerium nitrate, 1-hexadecane sodium sulfide, phthalocyanine blue, hexamethylenetetramine and water were mixed in a molar ratio of 1:0.2:0.04:4:1000 to prepare a solution, and such solution was kept at 95° C. for 20 hours. Phthalocyanine blue exhibits poor solubility in water, and is incorporated in the micelle. The obtained precipitates were filtered, washed with water and then lyophilized.

The obtained ceramics exhibited a periodic structure characteristic to a mesostructure of 4.2 nm, 2.1 nm and 1.4 nm in an X-ray diffractometry, and a diffraction pattern pursuant to ceria crystals. Such obtained ceramics also comprised an absorption band of light of a wavelength in the vicinity of 600–750 nm, and yielded a blue-green color.

Example 4

Photooxidation was performed with a $\lambda$=172 nm UV light against the ceramics obtained in Example 1. Copper phthalocyanine blue is an organic metallic compound containing copper ion, and is made inorganic during the process of removing the organic substance by photooxidation.

The obtained ceramics exhibited a periodic structure characteristic to a mesostructure of 4 nm in an X-ray diffractometry, and a diffraction pattern pursuant to ceria crystals. Moreover, the absorption band by the organic substance disappeared in the infrared absorption measurement.

The present invention pertains to the synthesizing method of mesostructured oxide ceramics characterized in directly extracting oxide ceramics by utilizing homogenous precipitation reaction from a ceramics precursor under the coexistence of a nanometer-sized template formed of an organic compound or the association thereof. And, according to the present invention, the following exceptional advantages are yielded: 1) mesostructured oxide ceramics is synthesized from self assembled oxide ceramics and an organic substance, 2) mesostructured oxide ceramics are directly synthesized at a low temperature of 200° C. or less, 3) various mesostructured oxide ceramics may be directly synthesized without requiring thermal processing at high temperatures, 4) the product having the controlled structure, size, and the like of the pores is obtained, 5) the product having further sophisticated functions is obtained by incorporating a specific functional group or a functional organic compound in the template, and 6) the product having mesostructure in which an inorganic compound is formed is obtained.

What is claimed is:

1. A method of synthesizing a mesostructured oxide ceramic comprising:

employing a water-containing solvent which contains a metallic salt or metal complex as the ceramics precursor, a template formed from an organic compound or the association thereof, and a precipitant, and precipitating an oxide ceramic directly at a low temperature of 200° C. or less by utilizing a homogenous precipitation reaction from said ceramics precursor under the coexistence of a nanometer-sized template in the solvent, and then separating and collecting the obtained precipitate to obtain a mesostructured oxide ceramic formed of self-assembled oxide ceramics and the organic substance.

2. The method of claim 1, wherein the nanometer-sized template is formed from one type or a plurality of types of organic compound(s) or the associations thereof.

3. The method of claim 1, wherein one type or a plurality of types of organic compound(s) or the associations thereof are used as the nanometer-sized template, and, a functional group or a functional organic compound having specific functions of absorbing specific wavelengths of light or fluorescence is incorporated thereto to obtain the template added with the said functions of said one type or plurality of types of organic compound(s) or the associations thereof.

4. A method of synthesizing a mesostructured oxide ceramic comprising removing the organic substance from the mesostructured oxide ceramic prepared by the method of claim 1.

5. The method of claim 4, wherein one type or a plurality of types of organic compound(s) or the associations thereof is/are employed as the nanometer-sized template, an organic metallic compound is incorporated thereto, and a non-organic compound is formed in the mesostructure by making the organic metallic compound inorganic during the process of removing the organic substance.

6. The method of claim 1, wherein the ceramic precursor comprises a nitrate.

7. The method of claim 1, wherein the ceramic precursor comprises a sulfate.

8. The method of claim 1, which comprises precipitating tin oxide.

9. The method of claim 1, which comprises precipitating zinc oxide.

10. The method of claim 1, which comprises precipitating ceria or cerium oxide.

11. The method of claim 1, wherein said template comprises a block copolymer.

12. The method of claim 1, wherein said template comprises a surface active agent.

13. The method of claim 4, wherein said organic substance is removed by conducting decantation.

14. The method of claim 4, wherein said organic substance is removed by thermal processing.

15. The method of claim 4, wherein said organic substance is removed by photooxidation processing.

* * * * *